United States Patent [19]

Dean

[11] Patent Number: 4,593,066

[45] Date of Patent: Jun. 3, 1986

[54] IMPACT RESISTANT POLYAMIDE MOLDING COMPOSITIONS

[75] Inventor: Barry D. Dean, Broomall, Pa.

[73] Assignee: Atlantic Richfield Company, Los Angeles, Calif.

[21] Appl. No.: 637,987

[22] Filed: Aug. 6, 1984

[51] Int. Cl.⁴ .......................... C08L 51/00; C08F 8/30
[52] U.S. Cl. ...................................... 525/66; 525/179
[58] Field of Search ................................. 525/66, 179

[56] References Cited

U.S. PATENT DOCUMENTS 4,202,948  5/1980  Peascoe .................................. 525/70
4,381,366  4/1983  Sanderson et al. ..................... 525/66

Primary Examiner—John C. Bleutge
Assistant Examiner—A. L. Carrillo
Attorney, Agent, or Firm—Dennis M. Kozak

[57] ABSTRACT

The impact resistance of molded polyamide resin molding compositions is improved by incorporating thereinto an elastomer grafted with a polymer comprised of recurring units of, in weight percent, (A) from about 60 to about 95 vinyl aromatic monomer, (B) from about 5 to about 40 of at least one acid selected from the group consisting of acrylic acid, methacrylic acid, partially neutralized acrylic acid, partially neutralized methacrylic acid, totally neutralized acrylic acid and totally neutralized methacrylic acid and (C) 0 to about 15 acrylate monomer.

20 Claims, No Drawings

IMPACT RESISTANT POLYAMIDE MOLDING COMPOSITIONS

Reference is hereby made to copending applications Ser Nos. 557,975 filed Dec. 5, 1983, now U.S. Pat. No. 4,491,647; 589,368 filed Mar. 14, 1984; 593,143 filed Mar. 26, 1984 and 596,220 filed Apr. 2, 1984.

This invention relates to polyamide resin molding compositions.

More specifically, this invention relates to the impact modification of polyamide resin based molding compositions.

In one of its more specific aspects, this invention relates to the impact modification of polyamide resins by the introduction thereinto of an elastomer highly grafted with a polymer matrix.

Impact modification of polyamides by melt compounding the polyamide resin with an elastomer having pendant $\alpha,\beta$-unsaturated dicarboxylic anhydride functionality or carboxylic acid functionality is known. The pendant functionality consists of a maximum of 10 repeat units, thus the pendant functionality is not high molecular weight in nature. This approach is taught by U.S. Pat. Nos. 3,484,403; 4,041,163 and 4,427,828.

Another general approach to impact modify polyamides involves melt compounding the polyamide resin with ethylene copolymers where at least one comonomer is an $\alpha,\beta$-unsaturated dicarboxylic anhydride or an unsaturated acid containing comonomer. This approach is discussed in U.S. Pat. Nos. 3,963,799; 3,972,961; 3,976,720; 4,251,644; 4,283,502; 4,320,213; and 4,346,194.

All of the above cited art requires the carboxylic acid or carboxylic acid anhydride functionality for graft formation with polyamides by reaction of the carboxyl group with the terminal amine functionality of the nylon resin. Thermodynamic miscibility of the high polymeric components of the blend does not exist.

Yet another approach to impact modification of polyamides involves blending polyamide resins with incompatible elastomers or rubber modified acrylates and is taught by U.S. Pat. Nos. 3,842,029 and 3,274,289. Again thermodynamic miscibility of the high polymeric components of the blend components is not taught.

Further, blends of vinyl aromatic monomer/$\alpha,\beta$-unsaturated dicarboxylic anhydride/methacrylate terpolymers with polyamides as well as vinyl aromatic monomer/methacrylate copolymers with polyamides are taught in U.S. Pat. No. 4,421,892 and in British Pat. No. 1,440,030.

The present invention provides yet another approach to the impact modification of polyamide resins.

As used herein the term "polyamide resin" means polycaprolactam (nylon 6) and poly(hexamethylene) adipamide (nylon 6,6).

According to this invention there is provided a moldable composition comprising a polyamide resin and a polymeric impact modifier that comprises an elastomer grafted with from about 40 to about 60 weight percent of a polymer comprised of recurring units of, in weight percent, (A) from about 60 to about 95 vinyl aromatic monomer, (B) from about 5 to about 40 of at least one acid selected from the group consisting of acrylic acid, methacrylic acid, partially neutralized acrylic acid, partially neutralized methacrylic acid, totally neutralized acrylic acid, and totally neutralized methacrylic acid and (C) 0 to about 15 of an acrylate monomer, wherein the polymer which is grafted to the elastomer is thermodynamically miscible with the polyamide resin.

Also, according to the present invention there is provided a method of producing a molded composition which comprises forming a blend comprising a polyamide resin and an impact modifier that comprises an elastomer grafted with from about 40 to about 60 weight percent of a polymer comprised of recurring units of, in weight percent, (A) from about 60 to about 95 vinyl aromatic monomer, (B) from about 5 to about 40 of at least one acid selected from the group consisting of acrylic acid, methacrylic acid, partially neutralized acrylic acid, partially neutralized methacrylic acid, totally neutralized acrylic acid, and totally neutralized methacrylic acid and (C) 0 to about 15 of an acrylate monomer, wherein the polymer which is grafted to the elastomer is thermodynamically miscible with the polyamide resin, and molding the resulting blend.

Also, according to the present invention there is provided a molded composition comprising a continuous phase comprising a polyamide resin and a disperse phase within the continuous phase, the disperse phase being an elastomer grafted with from about 40 to about 60 weight percent of a polymer comprised of recurring units, of in weight percent, (A) from about 60 to about 95 vinyl aromatic monomer, (B) from about 5 to about 40 of at least one acid selected from the group consisting of acrylic acid, methacrylic acid, partially neutralized acrylic acid, partially neutralized methacrylic acid, totally neutralized acrylic acid, and totally neutralized methacrylic acid and (C) 0 to about 15 of an acrylate monomer, wherein the polymer which is grafted to the elastomer is thermodynamically miscible with said polyamide resin and is part of the continuing phase, the elastomer grafted with the polymer being present in the polyamide resin in an amount sufficient to improve the impact resistance of the polyamide resin upon molding.

According to this invention there is also provided a method of improving the impact strength properties of a polyamide resin upon molding which method comprises incorporating into a continuous phase polyamide resin a disperse phase comprising an elastomer grafted with from about 40 to about 60 weight percent of a polymer comprised of recurring units of, in weight percent, (A) from about 60 to about 95 vinyl aromatic monomer, (B) from about 5 to about 40 of at least one acid selected from the group consisting of acrylic acid, methacrylic acid, partially neutralized acrylic acid, partially neutralized methacrylic acid, totally neutralized acrylic acid, and totally neutralized methacrylic acid and (C) 0 to about 15 of an acrylate monomer wherein the polymer which is grafted to the elastomer is thermodynamically miscible with said polyamide resin and is part of the continuous phase, the elastomer grafted with the polymer being present in the polyamide resin in an amount sufficient to improve the impact resistance of the polyamide resin upon molding.

Two or more polymers are said to be thermodynamically miscible when the free energy of mixing is negative, and thermodynamic miscibility is said to exist when a mixture of two or more polymers results in a material exhibiting a single, well defined glass transition temperature.

The polycaprolactam used in the examples which follow was Capron ® 8200 polycaprolactam (Allied Chemical Company) however any polycaprolactam resin (nylon 6) is suitable for use. The poly(hexamethylene) adipamide used in the examples which follow was Zytel ® 42 poly(hexamethylene) adipamide (E. I. DuPont Company) however any poly(hexamethylene adipamide) (nylon 6,6) is suitable for use.

The impact modifier utilized in this invention is as an elastomer highly grafted with a polymer which exhibits thermodynamic miscibility with nylon 6 or nylon 6,6.

The elastomer component will have random dialkyl or alkyl aryl peroxide functionality. Any elastomer having pendant allylic, benzylic or conjugated unsaturation at levels within the range of from about 1 to about 20 wt. % is suitable for use.

Particularly suitable elastomers are olefin/olefin/nonconjugated terpolymers, generally known as EPDM rubbers, and butyl rubber. EPDM rubbers are preferred.

More specifically, the EPDM rubbers suitable for use in making the EPDM elastomer having random dialkyl or alkyl aryl functionality are based on monoolefins having the structural formula $CH_2=CHR$ in which R may be a hydrogen atom or a saturated alkyl group such as methyl, ethyl, n-propyl, isopropyl and the like. In addition, the EPDM rubbers are based on non-conjugated straight chain or cyclic diene hydrocarbons which are copolymerizable with the above mono olefins. Examples of suitable non-conjugated straight chain diene hydrocarbon copolymerizable with mono olefins are 1,4-pentadiene, 1,4-hexadiene, 1-5-hexadiene and the like. Examples of suitable cyclic diene hydrocarbons are bicyclo [2,2,1]hepta-2,5-diene, dicyclopentadiene and tertra cyclopentadiene. EPDM rubbers most preferred are terpolymer structures in which two mono olefins, ethylene and propylene, and one non-conjugated diene hydrocarbon are used. Most preferred for the non-conjugated diene hydrocarbon are 1,4-hexadene and dicyclopentadiene. The EPDM rubber should comprise 1 to 15% by weight of the non-conjugated diene hydrocarbon and 85 to 99% by weight of the mono olefins. The preferred ratio of the mono olefins, ethylene and propylene, should be 20/80 to 80/20, preferably between 35/65 and 65/35. Ethylenepropylene-ethylidene norbornene is not suitable for use in the practice of this invention. Methods for making these rubbers are well known and thoroughly described in U.S. Pat. No. 3,000,866 and U.S. Pat. No. 3,000,867, the teachings of which are incorporated herein by reference thereto.

The peroxidized elastomer used to prepare the impact modifier used in the practice of this invention is prepared as follows. The elastomer is dissolved in a solvent, preferably at a temperature within the range of from about 60°–80° C. The resulting rubber solution is then treated with an oxidizing agent in the presence of a catalyst. The oxidizing agent is an alkyl or aryl hydroperoxide but, most preferable is t-butyl hydroperoxide. The catalyst is selected from any metal in Group VIIIa, VIII, Ib or IIb with the appropriate choice of counter ion so as to promote solubility of the catalyst in the rubber solution. A small quantity of tetrahydrofuran or ethanol (absolute) may be added to enhance the solubility of the catalyst in the rubber solution. The peroxidation reaction is run for from about 5 to about 20 hours at a temperature preferably within the range of from about 60° to about 80° C.

Suitable solvents for dissolving the elastomer include various aromatic solvents such as benzene, t-butyl benzene, toluene, xylenes, and halogenated benzenes, such as chlorobenzene; however, most preferred are chlorobenzene and t-butylbenzene.

The catalyst employed to produce the peroxidized elastomer is based on metals of Group VIIa, VIII, Ib or IIb. The preferred metals are cobalt (Group VIII) or copper (Group Ib). Preferred catalysts are Cobalt (II) acetate, cobalt (II) propionate, cobalt (II) acetyl acetonate, cobalt (II) 2-ethyl hexanoate, cobalt (II) naphthenate, copper (I) napthenate, or copper (I) ethylacetoacetate. Most preferred are cobalt (II) acetylacetonate, cobalt (II) napthenate, copper (I) acetate, copper (I) chloride and copper (I) acetyl acetonate.

The peroxidized elastomer produced as described above typically exhibits 0.05 to 0.1 weight percent peroxide functionality.

The peroxidized elastomer is then treated with a polymer matrix (described below) and the resulting elastomer is 40 to 60% grafted therewith.

The polymer matrix grafted to the elastomer will comprise in weight percent, recurring units of, either (i) 60 to 95 vinyl aromatic monomer, 5 to 40 acrylic or methacrylic acid and optionally 0 to 15 of an acrylate monomer or (ii) 60 to 95 vinyl aromatic monomer, 5 to 40 partially or totally neutralized acrylic acid or methacrylic acid and optionally 0 to 15 of an acrylate monomer. Preferred compositions are 70 to 95 vinyl aromatic monomer, 5 to 30 acrylic or methacrylic acid and 0 to 15 acrylate monomer and 70 to 95 vinyl aromatic monomer, 5 to 30 partially or totally neutralized acrylic acid or methacrylic acid and 0 to 15 acrylate monomer. The polymer matrix peak molecular weight should be 50,000 to 500,000 preferably 50,000 to 250,000.

The vinyl aromatic monomer can be selected from styrene, α-methyl styrene, p-methyl styrene, t-butyl styrene and other substituted styrenes available to one skilled in the art. The vinyl aromatic monomer most preferred is styrene.

The preferred acid moeity is methacrylic acid and the preferred partially or totally neutralized acid moeity is methacrylic acid. Most preferred is total neutralization of methacrylic acid moeity. The neutralization of the acid moeity can be accomplished with monovalencations from sodium hydroperoxide, potassium hydroxide and cesium hydroxide as well as with divalencations from zinc (acetyl acitonate)$_2$, zinc(acetate)$_2$, and the like.

The acrylate monomer can be selected from methyl methacrylate, ethyl methacrylate, methyl acrylate, n-butyl acrylate, ethyl acrylate, 2-ethylhexyl acrylate and the like. Most preferred for the acrylate monomer is methyl methacrylate.

The elastomer-g-polymer matrix is comprised of 50 to 99% elastomer and from 1 to 50% of polymer matrix. The most preferred composition is 50 to 70% elastomer and from 50 to 30% polymer matrix.

A molding composition according to this invention will comprise, in weight percent, from about 50 to about 99 polyamide resin and from about 1 to about 50 of the elastomer-g-polymer matrix. Preferably, the molding composition will comprise from about 50 to about 70 polyamide resin and from about 30 to about 50 elastomer-g-polymer matrix.

Prior to melt blending with a polyamide resin the elastomer grafted with the polymer matrix is preferably stabilized with 2 weight percent of any conventional stabilizer. The preferred stabilizer is a 50:50 mixture of Ethanox ® 330 stabilizer (Ethyl Corp) [1,3,5-trimethyl-2,4,6-tris(3.5-di-tertbutyl-4-hydroxy benzyl) benzene] and Mark ® 2112 stabilizer (Witco Chemical Corp) tris (2,4-ditertbutyl-phenyl)phosphite.

The molding compositions of this invention can be molded using conventional molding equipment and the molding compositions can also include other ingredients such as extenders, processing aids, pigments, mold release agents, and the like, for their conventionally employed purpose. Also reinforcing fillers in amounts sufficient to impart reinforcement can be used, such as titanium dioxide, potassion titanate and titanate whiskers, glass flakes and chopped glass fibers.

The following examples serve to demonstrate the invention. Evaluation of material properties was performed based on the following ASTM standard tests: Flexural modulus (D-790), tensile strength (D-638), elongation (D-638), notched Izod (D-256) and DTUL (deflection temperature underload, ⅛" at 264 psi., (D-648). Gardner falling weight index was established using a 1-¼" diameter, orifice and an 8 pound ½" diameter weight. Glass transition temperature, melting temperature and heat of fusion were determined by differential scanning calorimetry.

EXAMPLE 1

This example demonstrates the preparation of a peroxidized elastomer suitable for use to produce an impact modifier usable in this invention.

In a 4 liter resin kettle 400 grams of an ethylene/propylene/dicyclopentadiene terpolymer were dissolved in 2700 grams of chlorobenzene. The EPDM rubber dissolved readily in three and one half hours by heating the solution to 70° C. The resin kettle was charged with 120 grams of a 40% anhydrous t-butyl hydroperoxide in toluene solution.[1] Immediately after the addition of the hydroperoxide solution, 20 grams of a 6% cobalt solution as cobaltous napthenate in mineral spirits and 1.7 grams of cobaltous acetylacetonate dissolved in 22 milliliters of tetrahydrofuran were added. The reaction mixture was maintained at 70°–72° C. for 8 hours. The EPDM rubber solution was precipitated into a three fold excess of methanol using a high speed Waring Blender for agitation. The EPDM rubber was dried in vacuo at 25° C. and then dissolved in toluene and precipitated into methanol a second time. The peroxidized rubber was dried in vacuo at 25° C. for 48 hours. The level of peroxide functionality in the EPDM rubber was 1127 ppm.

[1] Prepared by extraction of a 70% t-butyl-hydroperoxide water solution with toluene according to the procedure described by K. B. Sharpless et al *Journal of Organic Chemistry*, 1983, 48 3607.

EXAMPLE 2

Approximately 200 grams of peroxidized EPDM rubber having 1127 ppm peroxide functionality were prepared according to the procedure of Example 1. The 200 grams of peroxidized EPDM were dissolved in 500 grams of chlorobenzene in a 3 pint pressure reaction vessel at 60° C. The reactor was charged with 200 grams of a terpolymer mixture comprised of 140 grams of styrene (S), 22 grams of methacrylic acid (MAA) and 38 grams of methyl methacrylate (MMA). The reactor was heated to 140° C. for four hours. The polymer mass obtained was precipitated in a three fold excess of methanol using a Waring Blender. The polymer crumb obtained was dried under vacuum at 110° C. The total EPDM-g-S/MAA/MMA recovered was 352 grams (88%). Thus the final composition was 57% EPDM; 43% S/MAA/MMA.

The composition of S/MAA/MMA was found to be 65% styrene, 23% methacrylic acid and 12% methylmethacrylate. Soxhlet extraction of 25 grams of the EPDM-g-S/MAA/MMA with methylethylketone for 130 hours revealed 6.2 grams (58%) of non-grafted S/MAA/MMA with peak molecular weight 212,700; Mw of 384,000 and Mn of 148,000. The level of S/MAA/MMA grafted to the EPDM rubber was 42%. The glass transition temperature of both the grafted and non-grafted S/MAA/MMA was 139° C.

The thermodynamic miscibility of nylon 6 with the S/MAA/MMA terpolymer(65%/23%/12%) is documented (Table I) by the increase in Tg of the blend versus pure nylon 6, the decrease in Tm of the blend versus pure nylon 6, and a heat of fusion lower than the expected dilution effect.

TABLE I

| | | |
|---|---|---|
| Capron ® 8200 nylon 6 | 100 wt % | 85 wt % |
| S/MAA/MMA(65/23/12) | 0 | 15 wt % |
| Tg (°C.) | 61 | 79.5 |
| Tm (°C.) | 223 | 217 |
| Hf (cal/g) | 16.84 | 6.86 |

A mixture of 700 grams of Capron ® 8200 polycaprolactam and 300 grams of the EPDM-g-S/MAA/MMA was stabilized with 6.1 grams of Mark ® 2112 and 3.2 grams of Ethanox ® 330. The mixture was extruded, pelletized and test specimens injection molded for property analysis. The physical properties of the blend are outlined in Table II.

TABLE II

| | | |
|---|---|---|
| Capron ® 8200 nylon 6 | 100 wt % | 70 wt % |
| EPDM-g-S/MAA/MMA | 0 | 30 wt % |
| Tg (°C.) | 61 | 81 |
| Tm (°C.) | 223 | 218 |
| Tensile str (psi) | 9200 | 7800 |
| Flex Mod (psi) | 370,000 | 388,000 |
| DTUL (⅛", °F.) | | |
| 264 psi | 108 | 121.5 |
| 64 psi | 157 | 162.5 |
| Notched Izod (ft-lbs/in) | 1.7 | 5.9 |
| GFWI (in-lbs) | 400 | 392 |
| Elongation (%) | 220 | 187 |

EXAMPLE 3

Approximately 200 grams of peroxidized EPDM rubber having 1070 ppm peroxide functionality were prepared according to the procedure of Example 1. The 200 grams of peroxidized EPDM were dissolved in 500 grams of chlorobenzene in a 3 pint pressure reaction vessel at 60° C. The reactor was charged with 200 grams of a termonomer mixture comprised of 140 grams of -methylstyrene (MeS), 47 grams of methacrylic acid (MAA) and 13 grams of methyl methacrylate (MMA). The reactor was heated to 140° C. for four hours. The polymer mass obtained was precipitated in a three fold excess of methanol using a Waring Blender. The polymer crumb obtained was dried under vacuum at 110° C. The total EPDM-g- MeS/MAA/MMA recovered was 390 grams (97.5%). Thus, the final composition was 51% EPDM; 49% -MeS/MAA/MMA. The composition of the -MeS/MAA/MMA was 69% -methyl styrene, 20% methacrylic acid and 11% methyl methacrylate. Soxhlet extraction of 25 grams of the EPDM-g-αMeS/MAA/MMA with methyl ethyl ketone for 128 hours revealed 6.49g (53%) of non grafted α-MeS/MAA/MMA with a peak molecular weight 263,400 Mw=401,120 and Mn=149,200. The level of α-MeS/MAA/MMA grafted to the EPDM rubber was 47%.

The glass transition temperature of both the grafted and non grafted α-MeS/MAA/MMA was 159° C.

The thermodynamic miscibility of nylon 6 with the α-MeS/MAA/MMA terpolymer (69%/20%/11%) is documented in Table III by the increase in Tg of the blend versus pure nylon 6, the decrease in Tm of the blend versus pure nylon 6 and a heat of fusion lower than expected for the dilution effect.

TABLE III

| Capron ® 8200 nylon 6 | 100 wt % | 78 wt % |
|---|---|---|
| MeS/MAA/MMA | 0 | 22 |
| Tg (°C.) | 61 | 83.5 |
| Tm (°C.) | 223 | 217.5 |
| Hf (cal/g) | 16.84 | 10.5 |

A mixture of 650 grams of Capron ® 8200 nylon 6 and 350 grams of EPDM-g-αMeS/MAA/MMA was stabilized with 5.0 grams of Mark ® 2112 stabilizer and 4.8 grams of Ethanox ® 330 stabilizer. The mixture was extruded, pelletized and test specimens injection molded for physical property analysis. The physical properties of the blend are outlined in following Table IV.

TABLE IV

| Capron ® 8200 nylon 6 | 100 wt % | 65 wt % |
|---|---|---|
| EPDM-g- —MeS/MAA/MMA | 0 | 35 wt % |
| Tg (°C.) | 61 | 85.5 |
| Tm (°C.) | 223 | 217 |
| Hf (cal/g) | 16.84 | 8.85 |
| Tensile str (psi) | 9200 | 7750 |
| Flex mod (psi) | 370,000 | 379,000 |
| DTUL (⅛" °F.) | | |
| 264 psi | 108 | 128.5 |
| 64 psi | 157 | 179.5 |
| Notched Izod (ft-lbs/in) | 1.7 | 6.3 |
| GFWI (in-lbs) | 400 | 408 |
| Elongation (%) | 220 | 195 |

EXAMPLE 3

Approximately 200 grams of peroxidized EPDM rubber having 1121 ppm peroxide functionality were prepared according to the procedure of Example 1. The 200 grams of peroxidized EPDM were dissolved in 500 grams of chlorobenzene in a 3 pint pressure reaction vessel at 60° C. The reactor was charged with 200 grams of a comonomer mixture comprised of 90% styrene monomer (S) and 10% methacrylic acid monomer (MAA). The reactor was heated to 140° C. for four hours. The polymer mass obtained was precipitated in a three fold excess of methanol using a Waring Blender. The polymer crumb obtained was dried under vacuum at 110° C. The total EPDM-g-S/MAA recovered was 392 grams (97% conversion). Soxhlet extraction of 25 grams of the EPDM-g-S/MAA with methyl ethyl ketone for 120 hours revealed 5.24 grams (43.5%) of non grafted S/MAA with peak molecular weight of 187,000, Mw=279,100 and Mn=137,000. The level of S/MAA grafted to the EPDM rubber was 56.5%. The glass transition temperature of both the grafted and nongrafted S/MAA was 123° C. The S/MAA copolymer grafted to the EPDM contained 10% by weight of methacrylic acid.

The EPDM-g-S/MAA (350g) was then brought to a molten state in a Brabender mixing head. The carboxylic acid functionality was converted entirely to the zinc carboxylate salt (forming a totally neutralized MAA) by reacting the EPDM-g-S/MAA with 23.5 grams of zinc (acetylacetonate) at 500° F. The glass transition of the ionomeric form of the S/MAA polymer matrix was 141° C.

The thermodynamic miscibility of nylon 6,6 with S/MAA "Zn ionomer" is documented in Table V by the increase in Tg of the blend versus pure nylon 6,6; the decrease in Tm of the blend versus pure nylon 6,6 and a heat of fusion lower than expected for the dilution effect.

TABLE V

| Zytel ® 42 nylon 6,6 | 100 wt % | 78 wt % |
|---|---|---|
| S/MAA "Zn ionomer" | 0 | 22 wt % |
| Tg (°C.) | 72 | 86 |
| Tm (°C.) | 261.3 | 256.4 |
| Hf (cal/g) | 10.82 | 6.54 |

A mixture of 650 grams of nylon 6,6 (Zytel 42) and 350 grams of EPDM-g-S/MAA "Zn ionomer" was stablized with 6.0 grams of Mark ® 2112 stabilizer and 6.0 grams of Ethanox ® 330 stabilizer. The mixture was extruded, pelletized and test specimens injection molded for physical property analysis. The physical properties of the blend are outlined in Table VI.

TABLE VI

| Zytel ® 42 nylon 6,6 | 100 wt % | 65 wt % |
|---|---|---|
| EPDM-g-S/MAA "Zn ionomer" | 0 | 35 wt % |
| Tg (°C.) | 72 | 86 |
| Tm (°C.) | 261.3 | 256.4 |
| Hf (cal/g) | | 6.54 |
| Tensile str (psi) | 10,000 | 6800 |
| Flex mod (psi) | 380,000 | 383,000 |
| DTUL (⅛", °F.) 264 psi | 132 | 158 |
| Notched Izod (ft-lbs/in) | 1.5 | 6.4 |
| GFWI (in-lbs) | 420 | 424 |
| Elongation (%) | 250 | 176 |

It will be evident from the foregoing that various modifications can be made to this invention such, however, are considered as being within the scope of the invention.

What is claimed is:

1. A moldable composition comprising a polyamide resin and an elastomer having pendant allylic, benzylic or conjugated unsaturation at levels within the range of from about 1 to about 20 weight percent and grafted with from about 40 to about 60 weight percent of a polymer comprised of recurring units of, in weight percent, (A) from about 60 to about 95 vinyl aromatic monomer, (B) from about 5 to about 40 of at least one acid selected from the group consisting of acrylic acid, methacrylic acid, partially neutrlized acrylic acid, partially neutralized methacrylic acid, totally neutralized acrylic acid and totally neutralized methacrylic acid and (C) 0 to about 15 acrylate monomer, wherein said polymer which is grafted to the elastomer is thermodynamically miscible with the polyamide resin.

2. The composition of claim 1 in which the polyamide resin is a polycaprolactam.

3. The composition of claim 1 in which the polyamide resin is a poly(hexamethylene) adipamide.

4. The composition of claim 1 in which said elastomer is ethylene/propylene/1-4 hexadiene.

5. The composition of claim 1 in which said elastomer is ethylene/propylene/dicyclopentadiene.

6. The composition of claim 1 in which said elastomer is butyl rubber.

7. The composition of claim 1 in which said vinyl aromatic monomer is selected from the group consisting of styrene, α-methyl styrene, p-methyl styrene and t-butyl styrene.

8. The composition of claim 1 in which said acrylate monomer is selected from the group consisting of methyl methacrylate, ethyl methacrylate, n-butyl acrylate, methyl acrylate, ethylacrylate, and 2-ethylhexyl acrylate.

9. The composition of claim 4 in which said elastomer is grafted with a styrene/methacrylic acid copolymer.

10. The composition of claim 9 in which said methylacrylic acid is totally neutralized.

11. The composition of claim 5 in which said elastomer is grafted with a styrene/methacrylic acid copolymer.

12. The composition of claim 11 in which said methylacrylic acid is totally neutralized.

13. The composition of claim 6 in which said elastomer is grafted with a styrene/methacrylic acid copolymer.

14. The composition of claim 13 in which said methylacrylic acid is totally neutralized.

15. The composition of claim 1 containing a reinforcing filler.

16. The composition of claim 1 in which said elastomer grafted with polymer is present in an amount within the range of from about 1 to about 50 weight percent and said polyamide resin is present in an amount within the range of from about 50 to about 99 weight percent.

17. A method of producing a molded composition which comprises forming a blend comprising a polyamide resin and an elastomer having pendant allylic, benzylic or conjugated unsaturation at levels within the range of from about 1 to about 20 weight percent and grafted with from about 40 to about 60 weight percent of a copolymer of a polymer comprised of recurring units of, in weight percent, (A) from about 60 to about 95 vinyl aromatic monomer, (B) from about 5 to about 40 of at least one acid selected from the group consisting of acrylic acid, methacrylic acid, partially neutrlized acrylic acid, partially neutralized methacrylic acid, totally neutralized acrylic acid and totally neutralized methacrylic acid and (C) 0 to about 15 acrylate monomer wherein the polymer which is grafted to the elastomer is thermodynamically miscible with the polyamide resin, and molding the resulting blend.

18. A method of claim 17 in which said blend is molded in contact with a reinforcing filler.

19. A molded composition comprising a continuous phase comprising a polyamide resin and a disperse phase being an elastomer having pendant allylic, benzylic or conjugated unsaturation at levels within the range of from about 1 to about 20 weight percent and grafted with from about 40 to about 60 weight percent of a polymer comprised of recurring units of, in weight percent, (A) from about 60 to about 95 vinyl aromatic monomer, (B) from about 5 to about 40 of at least one acid selected from the group consisting of acrylic acid, methacrylic acid, partially neutrlized acrylic acid, partially neutralized methacrylic acid, totally neutralized acrylic acid and totally neutralized methacrylic acid and (C) 0 to about 15 acrylate monomer wherein the polymer which is grafted to the elastomer is thermodynamically miscible with the polyamide resin, and is part of the continuous phase, said elastomer grafted with polymer being present in an amount sufficient to improve the impact resistance of the polyamide resin upon molding.

20. A method of improving the impact resistance of a polyamide resin upon molding which comprises incorporating into a continuous phase polyamide resin a disperse phase comprising an elastomer having pendant allylic, benzylic or conjugated unsaturation at levels within the range of from about 1 to about 20 weight percent and grafted with from about 40 to about 60 weight percent of a polymer comprised of recurring units of, in weight percent, (A) from about 60 to about 95 vinyl aromatic monomer, (B) from about 5 to about 40 of at least one acid selected from the group consisting of acrylic acid, methacrylic acid, partially neutrlized acrylic acid, partially neutralized methacrylic acid, totally neutralized acrylic acid and totally neutralized methacrylic acid (C) 0 to about 15 acrylate monomer wherein the polymer is thermodynamically miscible with the polyamide resin and is part of the continuous phase, the elastomer grafted with polymer being present in an amount sufficient to improve the impact resistance of the polyamide resin upon molding.

* * * * *